(12) United States Patent
Testanero

(10) Patent No.: US 9,660,700 B2
(45) Date of Patent: May 23, 2017

(54) METHOD, SYSTEM AND APPARATUS FOR AUTOMATICALLY LINKING CUSTOMIZABLE AND/OR PERSONALIZED DIGITAL CONTENT TO AN OBJECT

(71) Applicant: CELLOTAPE, Inc., Fremont, CA (US)

(72) Inventor: Nick Testanero, Torrington, CT (US)

(73) Assignee: CELLOTAPE, INC., Newark, CA (US)

( * ) Notice: Subject to any disclaimer, the term of this patent is extended or adjusted under 35 U.S.C. 154(b) by 99 days.

(21) Appl. No.: 13/673,674

(22) Filed: Nov. 9, 2012

(65) Prior Publication Data

US 2014/0134946 A1    May 15, 2014

(51) Int. Cl.
    *H04B 5/00* (2006.01)
(52) U.S. Cl.
    CPC .................... *H04B 5/0062* (2013.01)
(58) Field of Classification Search
    None
    See application file for complete search history.

(56) References Cited

U.S. PATENT DOCUMENTS

| | | | |
|---|---|---|---|
| 8,522,977 B1 | 9/2013 | Britt, Jr. | |
| 2006/0017573 A1 | 1/2006 | Noguchi | |
| 2007/0034686 A1* | 2/2007 | Davis et al. | 235/380 |
| 2010/0019482 A1* | 1/2010 | Kumagai et al. | 283/72 |
| 2011/0070828 A1* | 3/2011 | Griffin et al. | 455/41.1 |
| 2012/0061465 A1 | 3/2012 | Luo | |
| 2012/0075072 A1* | 3/2012 | Pappu | 340/10.1 |
| 2012/0309307 A1 | 12/2012 | D'Amico | |
| 2013/0140358 A1* | 6/2013 | Graef et al. | 235/379 |
| 2013/0206841 A1 | 8/2013 | Cairns | |
| 2013/0225079 A1 | 8/2013 | Ashour et al. | |
| 2014/0113549 A1* | 4/2014 | Beg et al. | 455/41.1 |

FOREIGN PATENT DOCUMENTS

EP    2469453    6/2012

OTHER PUBLICATIONS

Compucorp, Compucorp & Monroe 300-Series Portable Calculators, 1999 http://www.classiccmp.org/calcmuseum/compucorp_portable.htm.*
McFerran, How to use NFC tags, Mar. 2012 http://www.cnet.com/howto/howtousenfctagswithyourandroidmobilephone/.*
YouTube, how to program an NFC tag, Feb. 2012 https://www.youtube.com/watch?v=9nGs0R8-suQ.*
Non-Final Office Action mailed Sep. 22, 2014, U.S. Appl. No. 13/830,108, filed Mar. 14, 2013, Nick Testanero.
Final Office Action mailed Dec. 10, 2014, U.S. Appl. No. 13/830,108, filed Mar. 14, 2013, Nick Testanero.

* cited by examiner

*Primary Examiner* — Ping Hsieh
*Assistant Examiner* — James Yang
(74) *Attorney, Agent, or Firm* — Haverstock & Owens LLP

(57) ABSTRACT

A method, system and apparatus for automatically linking customizable and personalized information to a near field communication (NFC) tag comprises programming and/or encoding the NFC tag with a personalized message and then attaching the NFC tag body to an object such as a greeting card, event invitation, candle or gift basket. When the object is then received by the recipient, the recipient only needs to tap the NFC tag with a NFC enabled device in order to automatically access the personalized message. In some embodiments, the personalized message comprises a greeting, pictures, and/or other customizable digital content.

25 Claims, 2 Drawing Sheets

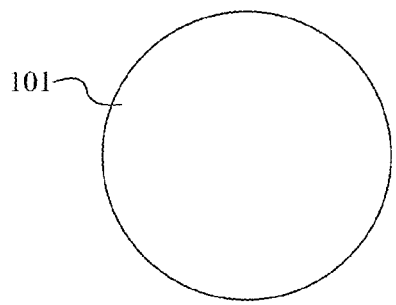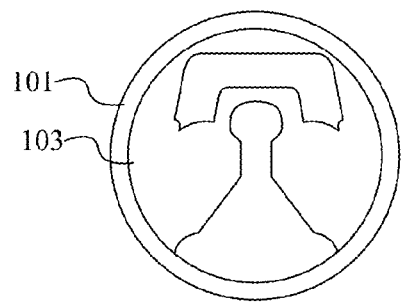
Fig. 1A   Fig. 1B
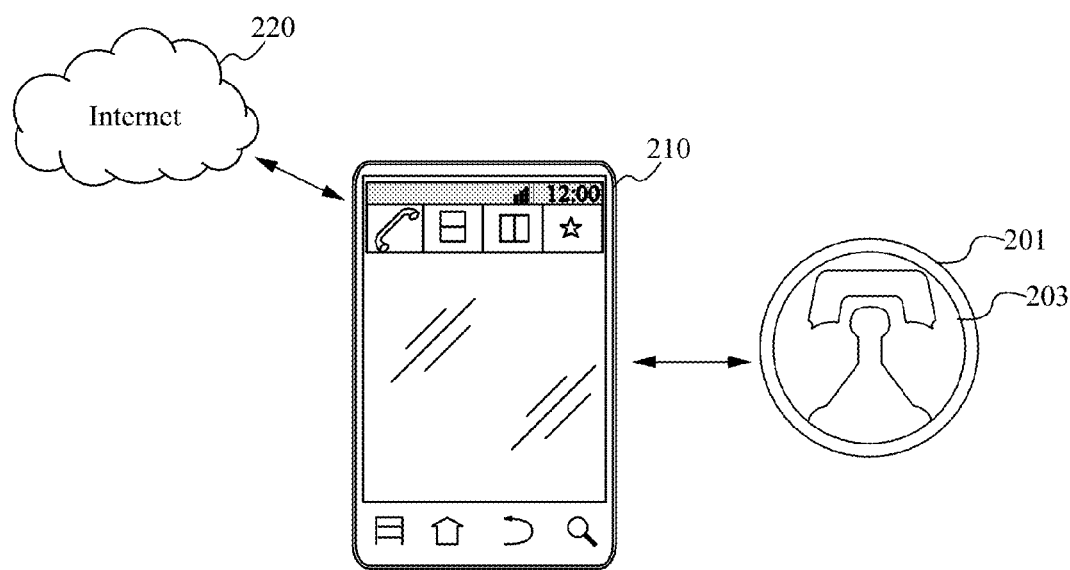
Fig. 2

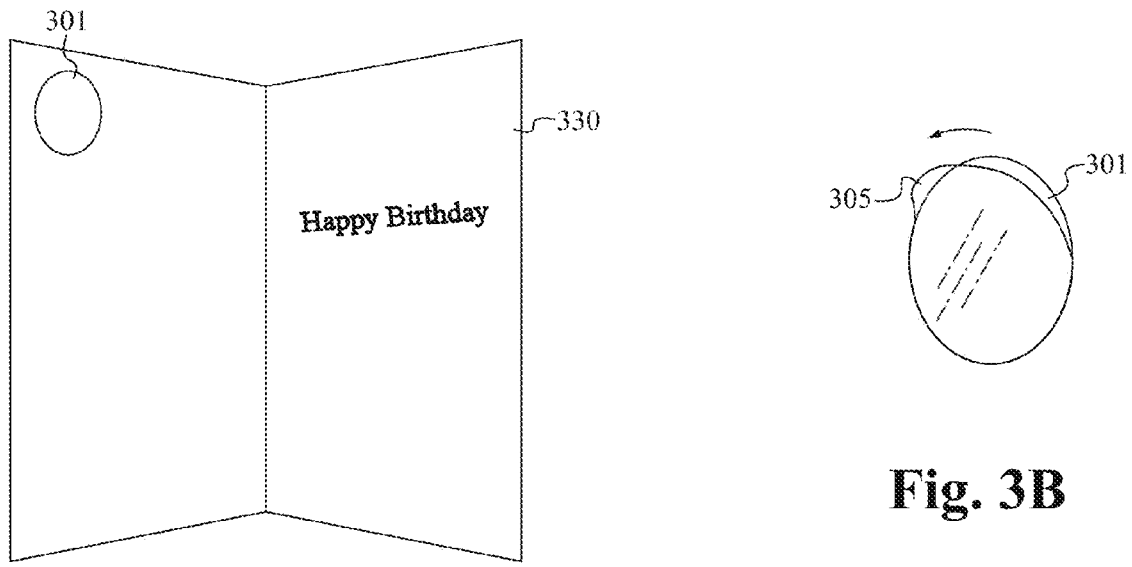
Fig. 3A
Fig. 3B
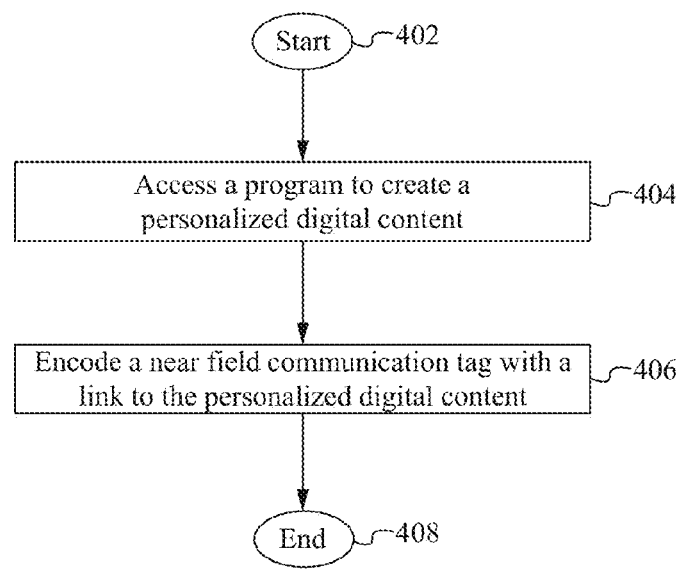
Fig. 4

1

METHOD, SYSTEM AND APPARATUS FOR AUTOMATICALLY LINKING CUSTOMIZABLE AND/OR PERSONALIZED DIGITAL CONTENT TO AN OBJECT

FIELD OF THE INVENTION

The present invention generally relates to the field of near field communication (NFC) and NFC tags. More specifically, the invention relates to independently programmable NFC tags and methods thereof.

BACKGROUND OF THE INVENTION

Near field communication (NFC) is a wireless technology that allows data transfer and communication between two closely situated and/or touching NFC enabled devices. By tapping the NFC devices together, data such as contact information, credit card information, text and URL information is able to be exchanged. Similarly, NFC tags with embedded NFC chips are encoded with information that may be accessed by the NFC enabled devices. NFC tags are attached to objects such as movie posters, menus, parking meters and railway turnstiles. Tapping these NFC tags allows the NFC enabled device to access movie data, menu nutritional information and pay for parking and railway tickets. The NFC chips and tags permit a NFC enabled device to access information and data in a fast and convenient manner. However, because the information is often pre-programmed or encoded to the NFC tag, the extent to which the information contained on the NFC tag is able to be customized or personalized is limited.

SUMMARY OF THE INVENTION

A method, system and apparatus for automatically linking customizable and personalized information to a near field communication (NFC) tag comprises programming and/or encoding the NFC tag with a personalized message and then attaching the NFC tag body to an object such as a greeting card, event invitation, candle or gift basket. When the object is then received by the recipient, the recipient only needs to tap the NFC tag with a NFC enabled device in order to automatically access the personalized message. In some embodiments, the personalized message comprises a greeting, pictures, and/or other customizable digital content.

In one aspect, a method of linking personalized digital content to an object comprises using a program in order to create a personalized digital content and encoding a near field communication tag with a link to the personalized digital content, wherein the personalized digital content is automatically accessed by tapping the encoded near field communication tag. In some embodiments, the encoded near field communication tag comprises a unique serial code. In some of these embodiments, the personalized digital content is only accessible by the encoded near field communication tag with the unique serial code. In some embodiments, the method further comprises installing the program on an electronic media device. In further embodiments, the near field communication tag is locked after the personalized digital content is encoded. In some embodiments, the personalized digital content is accessed by linking to a personalized web address or web based program. In some embodiments, the near field communication tag is embedded within a tag body. In some of these embodiments, the method further comprises attaching the tag body to an additional object. In some embodiments, the additional object comprises a candle, a greeting card, an event invitation, or a product gift basket. In further embodiments, the personalized digital content relates to the additional object. In some embodiments, the tag body is attached to the additional object after the near field communication tag is encoded.

In another aspect, a system for linking personalized digital content to an object comprises a programmable near field communication tag comprising a tag body and configured for attaching to an additional object and a program for encoding the near field communication tag with a personalized digital content. In some embodiments, the near field communication tag comprises a unique serial code. In some of these embodiments, the personalized digital content is only accessible by the encoded near field communication tag with the unique serial code. In some embodiments, the personalized digital content is automatically accessed by tapping the near field communication tag after the tag is encoded. In further embodiments, the personalized digital content is accessed by linking to a personalized web address or web based program. In some of these embodiments, the near field communication tag is locked after the tag is encoded. In some embodiments, the program is installed on an electronic media device. In some embodiments, the additional object comprises a candle, a greeting card, an event invitation, or a product gift basket. In further embodiments, the personalized digital content relates to the additional object. In some embodiments, the tag body is attached to the additional object after the near field communication tag is encoded.

In a further aspect, an apparatus for linking personalized digital content to an object comprises a tag body, a programmable near field communication tag embedded within the tag body and a mechanism for attaching the tag body to an additional object. In some embodiments, the tag body is attached to a candle, a greeting card, an event invitation, or a product gift basket. In some embodiments, the near field communication tag is encoded with a personalized digital content. In further embodiments, the personalized digital content relates to the additional object. In some embodiments, the personalized digital content is accessed by linking to a personalized web address or web based program.

In still a further aspect, an apparatus for linking personalized digital content to an object comprises a tag body, a programmable near field communication tag embedded within the tag body, a mechanism for attaching the tag body to an additional object and a removable cover. In some embodiments, the removable cover comprises instructions on how to encode the NFC tag and access the encoded information. In some embodiments, the removable cover is attached to the tag body with an adhesive, electrostatically, or by a hook and loop fastener.

BRIEF DESCRIPTION OF THE DRAWINGS

FIG. 1A illustrates a first side of an apparatus for automatically linking customizable and/or personalized information to an object in accordance with some embodiments.

FIG. 1B illustrates a second side of an apparatus for automatically linking customizable and/or personalized information to an object in accordance with some embodiments.

FIG. 2 illustrates a system for automatically linking customizable and/or personalized information to an object in accordance with some embodiments.

FIG. 3A illustrates an apparatus for automatically linking customizable and/or personalized information to an object attached to an object in accordance with some embodiments.

FIG. 3B illustrates an apparatus for automatically linking customizable and/or personalized information to an object in accordance with some embodiments.

FIG. 4 illustrates a method of automatically linking customizable and/or personalized information to an object in accordance with some embodiments.

DETAILED DESCRIPTION OF THE INVENTION

The description below concerns several embodiments of the presently claimed invention. The discussion references the illustrated preferred embodiment. However, the scope of the presently claimed invention is not limited to either the illustrated embodiment, nor is it limited to those discussed, to the contrary, the scope should be interpreted as broadly as possible based on the language of the Claims section of this document.

This disclosure provides several embodiments of the presently claimed invention. It is contemplated that any features from any embodiment can be combined with any features from any other embodiment. In this fashion, hybrid configurations of the illustrated embodiments are well within the scope of the presently claimed invention.

Referring now to FIGS. 1A and 1B, an apparatus for automatically linking customizable and/or personalized information to an object in is depicted therein. The apparatus 100 comprises a tag body 101 and a near field communication (NFC) tag 103 attached to or embedded within the body 101. In some embodiments, the body 101 further comprises an attachment mechanism for attaching the apparatus 100 to an additional object. For example, in some embodiments, the apparatus 100 further comprises an adhesive layer, hook and loop fastener or other means for attaching the apparatus 100 to the additional object.

In some embodiments, the NFC tag 103 is blank and comprises a serial code unique to the NFC tag 103. The NFC tag 103 is able to be programmed and/or encoded with personalized digital content. For example, the NFC tag 103 is able to be encoded with a link to a personalized web address or web program which contains personalized digital content such as a video message, audio message and/or pictures. In some embodiments, the personalized web address or web program is private and unique to the NFC tag 103 and is only able to be accessed by the NFC tag 103 with the serial code and link corresponding to the web address or web program. After the NFC tag 103 is encoded, the personalized message is automatically accessed by tapping the tag body 101 with a NFC enabled device, which accesses the personalized web address or web program and begins playing the message.

In some embodiments, in order to program and/or encode the personalized content to the NFC tag 103, a NFC enabled device is used. FIG. 2 illustrates a system for automatically linking customizable and/or personalized information to an object in accordance with some embodiments. In some embodiments, an application loaded onto a NFC enabled device 210 is used to program and/or encode the NFC tag 203 with personalized digital content. In some embodiments, the NFC enabled device 210 is an electronic media device such as a smart phone or tablet. However, any appropriately equipped NFC enabled device is able to be used. In this manner, a user is able to create a personalized digital content and encode the NFC tag 203 with a link to the personalized digital content. Once the NFC tag 203 is encoded, a NFC device such as depicted in FIG. 2, is used to tap the tag body 201 in order to access the personalized digital content. As described above, when the tag body 201 is tapped, the NFC enabled device automatically accesses a personalized web address or web program through the internet 220 and begins playing the personalized message. In some embodiments, the NFC tag 203 is locked after it is encoded so that it cannot be written over. In some embodiments, the NFC tag 203 is rewritable.

FIG. 3 shows a tag body 301 and NFC tag attached to an additional object 330 in accordance with some embodiments. The NFC tag and tag body 301 are similar to the NFC tag 103 and tag body 101 as described above. Particularly, the NFC tag is blank and comprises an individual serial code unique to the NFC tag. The NFC tag is able to be programmed and/or encoded with personalized digital content such as a video message, audio message and/or pictures.

As shown in FIG. 3, the tag body 301 is attached to a greeting card. In some embodiments, the tag body 301 is attached to the greeting card by an adhesive layer or hook and loop fastener. However, the tag body 301 is able to be attached to the greeting card by any appropriate mechanism as known in the art. In these embodiments, the NFC tag is programmed and/or encoded with personalized digital content before the tag body 301 is attached to the additional object 330. Specifically, the tag body 301 is attached to the additional object 330 after the personalized digital content is created and the NFC tag is encoded with a link to the content. Then, as described above, when the tag body 301 is tapped by a NFC enabled device, the personalized content is accessed and automatically begins playing.

For example, if a user is sending a birthday card, the user is able to create a personalized happy birthday message and upload the content to a unique and/or private personal web address or web program. A NFC tag is encoded with a link to the personal web address or web program containing the happy birthday message and the tag body containing the NFC tag is attached to the birthday card. Consequently, when the birthday card is received and the tag body is tapped by a NFC enabled device, the personalized happy birthday message is accessed and automatically begins playing.

In some embodiments, the NFC tag is encoded with information about the object to which it is attached. For example, a NFC tag body is attached to an event invitation and the NFC tag is encoded with a link to personalized digital content created by the host of the event that describes the event and invites the recipient to the event. Alternatively, in some embodiments, the NFC tag body is attached to a gift basket and the NFC tag is encoded with a link to personalized digital content describing the contents of the basket. As will be apparent to someone of ordinary skill in the art, the NFC tag is able to link to any appropriate desired information. Additionally, the NFC tag and NFC tag body 301 are able to be attached to any appropriate desired object. For example, in some embodiments, the NFC tag and NFC tag body 301 are attached to a candle or other gift item. In some embodiments, the NFC tag body 301 further comprises a removable 305 cover which contains instructions on how to encode the NFC tag and access the encoded information. The removable cover 305 can be attached to the tag body 301 with an adhesive, electrostatically, or by a hook and loop fastener. As shown within FIG. 3B, the cover 305 is removed by peeling off before the NFC tag is encoded.

FIG. 4 illustrates a method for linking personalized digital content to an object, in accordance with some embodiments. As shown in FIG. 4, in the step 404, a program is used in order to create personalized digital content. In some embodiments, the personalized digital content is a video message, audio message and/or pictures. For example, in some embodiments, the personalized digital content is a happy birthday message. In the step 406, a NFC tag is encoded with a link to the personalized digital content. In some embodiments, the NFC tag comprises a serial code unique to the NFC tag and the encoded personalized digital content is only able to be accessed by the NFC tag with that unique serial code. As described above, tapping the NFC tag with a NFC enabled device accesses and begins playing the personalized digital content. In some embodiments, the NFC tag is attached to an additional object.

In use, an encodable NFC tag is programmed with personalized digital content and combined with a greeting card or other object in order to create a personalized message. To link the personalized digital content to the NFC tag, personalized digital content such as a personal message and/or a personal greeting is created. Then, a blank NFC tag with a unique serial code is encoded with the link to the personalized digital content. After the NFC tag is encoded, tapping the tag with a NFC enabled device opens the link to the personalized digital content and the content automatically begins playing on the NFC enabled device. By attaching the NFC tag to an object such as a gift or greeting card, a personalized message is able to be sent along with the object. Additionally, because the NFC tag is able to be encoded and read by the NFC enabled device, the NFC tag is easily programmed and read. In this manner, a use can quickly and easily create personalized messages, objects and gifts for family, friends and business contacts. Accordingly, the presently claimed invention as described herein has many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. A method of linking user generated digital content to an object, comprising:
   a. using a program to access a private link to create user generated digital content associated with the object; and
   b. encoding a blank near field communication tag with the private link, the blank near field communication tag comprising a serial code unique to the blank near field communication tag and also to the private link wherein the user generated digital content is only accessible by the encoded near field communication tag with the unique serial code,
   wherein the user generated digital content is automatically accessed by tapping the encoded near field communication tag.

2. The method of claim 1, further comprising installing the program on an electronic media device.

3. The method of claim 1, wherein the near field communication tag is locked after the user generated digital content is encoded.

4. The method of claim 1, wherein the user generated digital content is accessed by linking to a personalized web address or web based program.

5. The method of claim 1, wherein the near field communication tag is embedded within a tag body.

6. The method of claim 5, further comprising attaching the tag body to an additional object.

7. The method of claim 6, wherein the additional object comprises a candle, a greeting card, an event invitation, or a product gift basket.

8. The method of claim 6, wherein the user generated digital content relates to the additional object.

9. The method of claim 6, wherein the tag body is attached to the additional object after the near field communication tag is encoded.

10. A system for linking user generated digital content to an object, wherein the user generated digital content is associated with the object, the system comprising:
    a. a blank programmable near field communication tag encoded with a private link, the near field communication tag and comprising a serial code unique to the blank near field communication tag, and a tag body configured for attaching the blank near field communication tag to an additional object; and
    b. a program accessing the private link for encoding the near field communication tag with a user generated digital content wherein the user generated digital content is only accessible through the private link by the encoded near field communication tag with the unique serial code.

11. The system of claim 10, wherein the user generated digital content is automatically accessed by tapping the near field communication tag after the tag is encoded.

12. The system of claim 11, wherein the user generated digital content is accessed by linking to a personalized web address or web based program.

13. The system of claim 10, wherein the near field communication tag is locked after the tag is encoded.

14. The system of claim 10, wherein the program is installed on an electronic media device.

15. The system of claim 10, wherein the additional object comprises a candle, a greeting card, an event invitation, or a product gift basket.

16. The system of claim 10, wherein the user generated digital content relates to the additional object.

17. The system of claim 10, wherein the tag body is attached to the additional object after the near field communication tag is encoded.

18. An apparatus for linking user generated digital content to an object, the user generated content associated with the object, the apparatus comprising:
    a. a tag body;
    b. a near field communication tag encoded with a private link, the near field communication tag comprising a serial code unique to the near field communication tag and also to the private link wherein the user generated digital content is only accessible by the encoded near field communication tag with the unique serial code, and wherein, the near field communication tag is embedded within the tag body; and
    c. a mechanism for attaching the tag body to an additional object.

19. The apparatus of claim 18, wherein the tag body is attached to a candle, a greeting card, an event invitation, or a product gift basket.

20. The apparatus of claim 18, wherein the near field communication tag is encoded with a user generated digital content.

21. The apparatus of claim 20, wherein the user generated digital content relates to the additional object.

22. The apparatus of claim 20, wherein the user generated digital content is accessed by linking to a personalized web address or web based program.

23. An apparatus for linking user generated digital content to an object, the user generated digital content associated with the object, the apparatus comprising:
   a. a tag body;
   b. a near field communication tag encoded with a private link, the near field communication tag comprising a serial code unique to the near field communication tag and also to the private link wherein the user generated digital content is only accessible by the encoded near field communication tag with the unique serial code, and wherein, the near field communication tag is embedded within the tag body;
   c. a mechanism for attaching the tag body to an additional object; and
   d. a removable cover.

24. The apparatus of claim 23, wherein the removable cover comprises instructions on how to encode the NFC tag and access the encoded information.

25. The apparatus of claim 23 wherein the removable cover is attached to the tag body with an adhesive, electrostatically, or by a hook and loop fastener.

* * * * *